United States Patent
Wang et al.

(10) Patent No.: US 10,237,285 B2
(45) Date of Patent: Mar. 19, 2019

(54) METHOD AND APPARATUS FOR DETECTING MACRO VIRUSES

(71) Applicant: Zhuhai Juntian Electronic Technology Co., Ltd., Zhuhai (CN)

(72) Inventors: Yunfeng Wang, Beijing (CN); Guangcai Liang, Beijing (CN); Zhiyuan Fu, Beijing (CN)

(73) Assignee: Zhuhai Juntian Electronic Technology Co., Ltd., Guangdong (CN)

(*) Notice: Subject to any disclaimer, the term of this patent is extended or adjusted under 35 U.S.C. 154(b) by 0 days.

(21) Appl. No.: 14/901,883

(22) PCT Filed: Aug. 14, 2014

(86) PCT No.: PCT/CN2014/084389
§ 371 (c)(1),
(2) Date: Dec. 29, 2015

(87) PCT Pub. No.: WO2015/123972
PCT Pub. Date: Aug. 27, 2015

(65) Prior Publication Data
US 2016/0156645 A1    Jun. 2, 2016

(30) Foreign Application Priority Data
Feb. 24, 2014    (CN) .......................... 2014 1 0061998

(51) Int. Cl.
*H04L 29/06*    (2006.01)
*G06F 21/56*    (2013.01)

(52) U.S. Cl.
CPC .......... *H04L 63/1416* (2013.01); *G06F 21/56* (2013.01); *H04L 63/145* (2013.01); *H04L 63/1425* (2013.01)

(58) Field of Classification Search
CPC .......................... H04L 63/1416; H04L 63/145; H04L 63/1425
(Continued)

(56) References Cited

U.S. PATENT DOCUMENTS

| | | | |
|---|---|---|---|
| 5,951,698 A | * | 9/1999 | Chen ..................... G06F 21/563 714/38.1 |
| 6,577,920 B1 | | 6/2003 | Hyppönen et al. |

(Continued)

FOREIGN PATENT DOCUMENTS

| | | |
|---|---|---|
| CN | 102045368 A | 5/2011 |
| CN | 102708320 A | 10/2012 |

(Continued)

OTHER PUBLICATIONS

Chamorro et al., "The Design and Implementation of an Antivirus Software Advising System," 2012 Ninth International Conference on Information Technology—New Generations Year: 2012 pp. 612-617.*

(Continued)

*Primary Examiner* — Roderick Tolentino
(74) *Attorney, Agent, or Firm* — Maginot, Moore & Beck, LLP

(57) ABSTRACT

Disclosed are a method and an apparatus for detecting macro viruses. The method includes: if a data file processing program has already performed an opening operation on a target data file but has not yet performed a loading operation on a content of the target data file, calling a macro virus detecting module registered previously as a plug-in of the data file processing program; detecting the target data file by using the macro virus detecting module. Applying the embodiment of the present disclosure, the macro virus detecting module may identify the format of all data files and may perform the internal analysis of the data files, thus improving the coverage of the detected data files.

6 Claims, 2 Drawing Sheets

(58) Field of Classification Search
USPC .................................................. 726/22–25
See application file for complete search history.

(56) References Cited

U.S. PATENT DOCUMENTS

| | | | | |
|---|---|---|---|---|
| 6,697,950 | B1* | 2/2004 | Ko | G06F 21/562 |
| | | | | 713/188 |
| 7,409,717 | B1* | 8/2008 | Szor | G06F 21/566 |
| | | | | 711/109 |
| 2002/0016925 | A1* | 2/2002 | Pennec | G06F 21/562 |
| | | | | 726/24 |
| 2003/0028489 | A1* | 2/2003 | Williamson | G06F 21/10 |
| | | | | 705/59 |
| 2004/0015712 | A1* | 1/2004 | Szor | G06F 21/566 |
| | | | | 726/24 |
| 2006/0174344 | A1* | 8/2006 | Costea | G06F 21/564 |
| | | | | 726/24 |
| 2009/0187992 | A1* | 7/2009 | Poston | G06F 21/563 |
| | | | | 726/24 |
| 2010/0162400 | A1* | 6/2010 | Feeney | G06F 21/563 |
| | | | | 726/24 |
| 2012/0297486 | A1* | 11/2012 | Turbin | G06F 21/562 |
| | | | | 726/24 |

FOREIGN PATENT DOCUMENTS

| | | |
|---|---|---|
| CN | 102841999 A | 12/2012 |
| CN | 103019872 A | 4/2013 |
| CN | 103294955 A | 9/2013 |
| CN | 103810428 A | 5/2014 |
| WO | WO2015123972 A1 | 8/2015 |

OTHER PUBLICATIONS

Vokorokos et al., "Malware categorization and recognition problem," IEEE 18th International Conference on Intelligent Engineering Systems INES 2014 Year: 2014.*

Chinese International Search Report corresponding to PCT application No. PCT/CN2014/084389, dated Nov. 21, 2014 (4 pages).

* cited by examiner

METHOD AND APPARATUS FOR DETECTING MACRO VIRUSES

CROSS REFERENCE TO RELATED APPLICATION

This application claims priority under 35 U.S.C 371 to, and is a U.S. National Stage application of, International Patent Application No. PCT/CN2014/084389, filed Aug. 14, 2014, which claims the benefit of prior Chinese Application No. 201410061998.6 filed Feb. 24, 2014. The entire contents of the above-mentioned patent applications are incorporated herein by reference as part of the disclosure of this application.

FIELD

The present disclosure generally relates to a computer security technology field, and more particularly to a method and an apparatus for detecting macro viruses.

BACKGROUND

A macro in the computer science refers to instruction sequences allowed to be used by a programming language in a data file. A macro virus refers to malicious instruction sequences written by a macro language and registered in the data file or a data file template, and when a user opens the data file infected by the macro virus or performs an operation (for example, storing, deleting, etc.) on the data file infected by the macro virus, the macro virus will be activated for running, thus resulting in a consequence desired by the macro virus.

With the development of computers and Internet, more and more people use the office software, and data files carrying macro viruses may be spread easily from one end of the earth to the other end, therefore the influence sphere and perniciousness of the macro viruses should not being overlooked. Currently, the detection and removal of the macro viruses has become a very important part in the computer security technology field.

In the related art, there are two methods for detecting the macro virus. The first method is to use the antivirus software to perform a static analysis on the data file, that is, to use the composite data file format to decompose and identify the structure of the data file, to extract feature codes of all macros in the data file, to match the feature codes of all macros in the data file with feature codes of macro viruses in the virus database, and to clear the macro if matching is successful. The second method is to use an active defense function of the antivirus software to monitor the behaviors of the data file processing program in real time, if malicious behavior is detected, to intercept the behavior, to suspend the execution of the data file processing program, to prompt the result and a possible consequence of executing the behavior, in which only when the user processes the behavior, the data file processing program could be continued.

However, in practical use, with respect to the first method the antivirus software is required to identify and analyze the structures of all data files, but due to a fact that different applications have different data file structures, this method is difficult to be achieved in practical use; in addition, if the data file is encrypted, the antivirus software cannot obtain the specific contents of the data file structure even if it can identify the structure of the data file, resulting in failure of analyzing the structure of the data file. Thus, with the first method, the coverage of macro virus detection is small.

With respect to the second method, more system resources are occupied when the user performs the operation on the data file, therefore affecting the overall performance of the machine. In addition, the detected "malicious behavior" may be a normal operating behavior of the user, or may be a real malicious behavior, which cannot be distinguished by the second method. Thus, in order to ensure security, warnings are given frequently to prompt the user, resulting in a poor user experience.

SUMMARY

The objective of embodiments of the present disclosure is to provide a method for detecting macro viruses and an apparatus for detecting macro viruses, thus increasing the coverage of the data files in which the macro virus may be detected, improving the user experience and reducing occupied system resources.

In order to achieve the above objective, embodiments of the present disclosure provide a method for detecting macro viruses, including:
  if a data file processing program has already performed an opening operation on a target data file but has not yet performed a loading operation on a content of the target data file, calling a macro virus detecting module preregistered as a plug-in of the data file processing program;
  detecting the target data file by the macro virus detecting module.

Preferably, calling a macro virus detecting module preregistered as a plug-in of the data file processing program includes:
  detecting whether the target data file includes a macro module;
  if the target data file includes the macro module, calling the macro virus detecting module preregistered as the plug-in of the data file processing program;
  detecting the target data file by the macro virus detecting module includes:
  detecting the macro module included in the target data file by the macro virus detecting module.

Preferably, detecting the macro module included in the target data file by the macro virus detecting module includes:
  extracting features of each macro module;
  matching the features with a virus feature built-in the macro virus detecting module;
  if a predetermined virus feature matching condition is satisfied, outputting a warning message of deterministic macro viruses.

Preferably, the method further includes:
  if no feature matches with the virus feature, further matching the features with a micro feature built-in the macro virus detecting module;
  if a predetermined micro feature matching condition is satisfied, outputting a warning message of non-deterministic macro viruses.

Preferably, the predetermined micro feature matching condition includes:
  a number of features extracted from the macro module and matched with the micro feature in the macro virus detecting module is greater than a predetermined threshold.

Preferably, the method further includes:
  analyzing an execution process and an execution result of the macro module satisfying the predetermined virus feature matching condition or the predetermined micro feature matching condition;

detecting whether there is an analysis result in a system;
if yes, performing a reverse repair for the system according to the execution process and the execution result of the macro module satisfying the predetermined virus feature matching condition or the predetermined micro feature matching condition.

In order to achieve the above objective, embodiments of the present disclosure also provide an apparatus for detecting macro viruses, including:

a calling unit, configured to call a macro virus detecting module pre-registered as a plug-in of a data file processing program, if the data file processing program has already performed an opening operation on a target data file but has not yet performed a loading operation on a content of the target data file;

a first detecting unit, configured to detect the target data file by using the macro virus detecting module.

Preferably, the calling unit is specifically configured to:

detect whether the target data file includes a macro module, if the data file processing program has already performed the opening operation on the target data file but has not yet performed a loading operation on the content of the target data file;

call the macro virus detecting module pre-registered as the plug-in of the data file processing program if the target data file includes the macro module;

the first detecting unit is specifically configured to:

detect the macro module included in the target data file by using the macro virus detecting module.

Preferably, the first detecting unit includes an extracting sub-unit, a first matching sub-unit and a first outputting sub-unit, in which:

the extracting sub-unit is configured to extract features of each macro module;

the first matching sub-unit is configured to match the features with a virus feature built-in the macro virus detecting module;

the first outputting sub-unit is configured to output a warning message of deterministic macro viruses if a predetermined virus feature matching condition is satisfied.

Preferably, the first detecting unit further includes a second matching sub-unit and a second outputting sub-unit, in which:

the second matching sub-unit is configured to further match the features with a micro feature built-in the macro virus detecting module if no feature matches with the virus feature;

the second outputting sub-unit is configured to output a warning message of non-deterministic macro viruses if a predetermined micro feature matching condition is satisfied.

Preferably, the predetermined micro feature matching condition includes:

a number of features extracted from the macro module and matched with the micro feature in the macro virus detecting module is greater than a predetermined threshold.

Preferably, the apparatus further includes an analyzing unit, a second detecting unit and a repair unit, in which:

the analyzing unit is configured to analyze an execution process and an execution result of the macro module satisfying the predetermined virus feature matching condition or the predetermined micro feature matching condition;

the second detecting unit is configured to detect whether there is an analysis result in a system;

the repair unit is configured to perform a reverse repair for the system according to the execution process and the execution result of the macro module if a detecting result of the second detecting unit is yes.

It can be seen from the above technical solutions that, since the macro virus detecting module is pre-registered as the plug-in of the data file processing program, in the case that the data file processing program has already performed the opening operation on the target data file but has not yet performed a loading operation on the content of the target data file, the macro virus detecting module is called to perform the detection on the target data file. Therefore, the macro virus detecting module may identify the format of all data files and may perform an internal analysis of the data files, thus improving the coverage of the detected data files.

In addition, the macro virus detecting module is called once only when the data file processing program has already performed the opening operation on the target data file but has not yet performed a loading operation on the content of the target data file, and is no longer running after the detection is completed. Compared with the existing method in which behaviors are monitored in real time, by using the method according to embodiments of the present disclosure, the occupied system resources are reduced, and warnings are not given frequently when the user operates the data file, thus improving the user experience.

Embodiments of the present disclosure also provide a computer-readable storage medium for storing computer programs that, when executed, performs the method for detecting macro viruses described above.

BRIEF DESCRIPTION OF THE DRAWINGS

In order to explicitly illustrate embodiments of the present disclosure or technical solutions in the related art, a brief introduction for the accompanying drawings used when describing the embodiments or the related art will be listed as follows. Apparently, the drawings described below are only corresponding to some embodiments of the present disclosure, and those skilled in the art may obtain other drawings according to these drawings without creative labor.

DETAILED DESCRIPTION

In the following, technical solutions in embodiments of the present disclosure will be described clearly and completely with reference to drawings in the embodiments. Apparently, the described embodiments are only part of embodiments of the present disclosure, instead of the entire embodiments. Based on embodiments described herein, those skilled in the art may obtain all other embodiments without creative labor, which belongs to the protection scope of the present disclosure.

Figure 1:
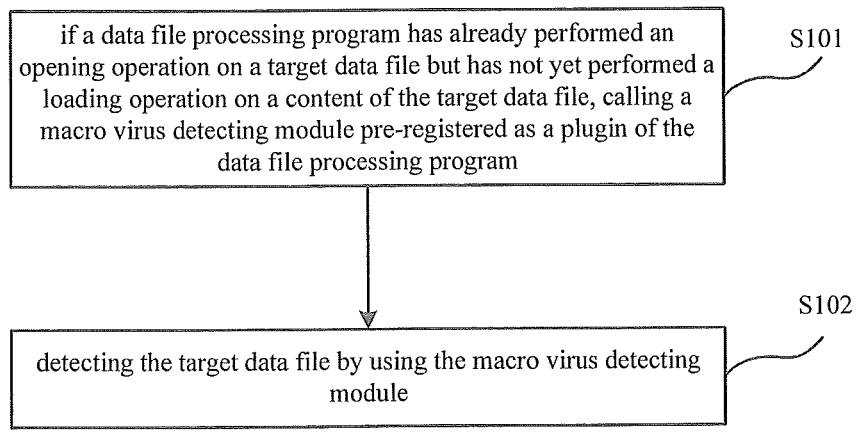
FIG. 1 is a flow chart illustrating a method for detecting macro viruses according to an embodiment of the present disclosure.

FIG. 1 is a flow chart illustrating a method for detecting a macro virus according to an embodiment of the present disclosure. As shown in FIG. 1, this method includes following steps.

In step 101, if a data file processing program has already performed an opening operation on a target data file but has not yet performed a loading operation on a content of the target data file, a macro virus detecting module pre-registered as a plug-in of the data file processing program is called.

For example, the data file processing program may be Microsoft Office 2007 (the office software developed by the Microsoft Corporation, and the version of which is 2007), and the target data file may be xxx.docx. The macro virus detecting module A is pre-registered as the plug-in of Microsoft Office 2007.

When xxx.docx has already been opened, but its content has not yet been performed a loading operation on, the macro virus detecting module A is called, in which xxx.docx may include a password and xxx.docx may be opened after entering the password.

In step S102, the target data file is detected by using the macro virus detecting module.

For example, xxx.docx is detected by the macro virus detecting module A.

In practical use, under the condition that the data file processing program has already performed an opening operation on the target data file but has not yet performed a loading operation on the content of the target data file, it may be detected whether the target data file includes a macro module, and if the target data file includes the macro module, the macro virus detecting module pre-registered as the plug-in of the data file processing program is called, and the macro module included in the target data file is detected by the macro virus detecting module.

For example, VBE object model of Microsoft Office document is represented as follows:
VBE object
  VBProjects
    VBProject
      VBComponents
        VBComponent
          CodeModule VBE object: a root object, including all other objects and collections expressible in the Visual Basic for Applications;

VBProjects: a collection of VBProject Objects, representing all opened projects in the development environment;

VBProject object: representing a project, i.e. the module project of the document itself;

VBComponents: a collection of VBComponent objects, representing components in the project;

VBComponent object: representing a component included the project, for example, a class module or a standard module;

CodeModule object: representing program codes (i.e. macro codes) behind components such forms, classes, documents or the like.

According to the VBE object model, the VBE object of the target data file xxx.docx is obtained first, and then CodeModule is obtained according to the VBE object, in which CodeModule represents the macro module. If CodeModule is not obtained, it indicates that there is no macro module in xxx.docx, and if CodeModule is obtained, it indicates that there is the macro module in xxx.docx. Assuming that the macro module named as macros is obtained in xxx.docx, the macro module named with macros in xxx.docx is detected by the macro virus detecting module A.

Further, in practical use, features of each macro module are extracted, the features are matched with a virus feature built-in the macro virus detecting module, and if a predetermined virus feature matching condition is matched, a warning message of deterministic macro viruses is outputted.

Assuming that the feature extracted from the macro module named as macros is releasing the drive file xxx.sys in the drive directory, and the virus feature built-in the macro virus detecting module includes releasing the drive file in the drive directory, then the extracted feature is matched with the virus feature built-in the macro virus detecting module, and a warning message "the file xxx.docx includes the macro virus named as macros" is output for the user.

For an excel document, in addition to the macro module, it may also have a macro table. The macro table is one kind of table including macro codes and is triggered by a specified name for executing. If the excel document includes the macro table, object collection sheets in the macro table are extracted, and then are enumerated one by one, so as to extract the features by obtaining codes in the table via the interface of the sheet. Then, the extracted features are matched with the virus feature built-in the data file processing program, and if the predetermined virus feature matching condition is satisfied, the warning message of deterministic macro viruses is outputted for the user.

If no feature matches with the virus feature, the features are further matched with a micro feature built-in the macro virus detecting module, and if a predetermined micro feature matching condition is satisfied, a warning message of non-deterministic macro viruses is outputted for the user.

Assuming that the extracted feature of the macro module named as macros is including delete module, the virus feature built-in the macro virus detecting module does not include the feature but the micro feature built-in the macro virus detecting module includes the feature, then it indicates that the extracted feature is matched with the micro feature built-in the macro virus detecting module, and a warning message "the macro module named as macros in the xxx.docx file may include the macro virus" is outputted for the user.

Further, in practical use, the warning message of non-deterministic macro viruses may be outputted for the user in the case that there are features matched with the micro feature, and a number of features extracted from the macro module and matched with the micro feature in the macro virus detecting module is greater than a predetermined threshold.

Assuming that the micro features in the macro virus detecting module include sensitive strings, suspicious function names and suspicious module names, in which "systemroot\drivers" is considered as the sensitive string, and the function names having "add", "delete" or "update" are considered as suspicious function names and the module names having "autorun" are considered as suspicious module names.

Further assuming that the extracted features of the macro module named as macros are including 4 strings having "systemroot\drivers", including 2 functions with the names having "delete", including 1 function with the name having "add", and including 2 sub modules with the names having "autorun".

Then, if the predetermined threshold is 8, the number of features extracted from the macro module named as macros and matched with the micro features built-in the macro virus detecting module, which is 9, is greater than the predetermined threshold 8, it indicates the macro module named as macros may include the macro virus, and then a warning message "the macro module named as macros in xxx.docx file may include the macro virus" is outputted for the user.

If the predetermined threshold is 10, the number of features extracted from the macro module named as macros and matched with the micro features built-in the macro virus detecting module, which is 9, is less than the predetermined threshold 10, it indicates the macro module named as macros does not include the macro virus, and then no warning message is outputted for the user.

In embodiments of the present disclosure, two kinds of warning messages are defined, in which the warning message of "deterministic macro viruses" refers to that, on the basis of the existing antivirus technology, the detected macro module is determined as actually including currently known macro viruses, and the warning message of "non-deterministic macro viruses" refers to that, on the basis of the existing antivirus technology, the detected macro module is determined as possibly including macro viruses, which is uncertain.

Applying the embodiment of the present disclosure shown in FIG. 1, the macro virus detecting module is preregistered as the plug-in of the data file processing program, and in the case that the data file processing program has already performed the opening operation on the target data file but has not yet performed a loading operation on the content of the target data file, the macro virus detecting module is called to perform the detection on the target data file. Therefore, the macro virus detecting module may identify the format of all data files and may perform the internal analysis of the data files, thus improving the coverage of the detected data files.

In addition, the macro virus detecting module is called once only when the data file processing program has already performed the opening operation on the target data file but has not performed a loading operation on the content of the target data file, and is no longer running after the detection is completed. Compared with the existing method in which the behaviors are monitored in real time, using the method according to embodiments of the present disclosure, the occupied system resources are reduced, and warnings are not given frequently when the user operates the data file, thus improving the user experience.

It should be noted that, in the above embodiment, the effect of running the feature matched macro module on the system is not taken into consideration. In the following, with respect to the effect of running the feature matched macro module on the system, embodiments of the present disclosure also provide another method for detecting macro viruses, as shown in FIG. 2.

Figure 2:
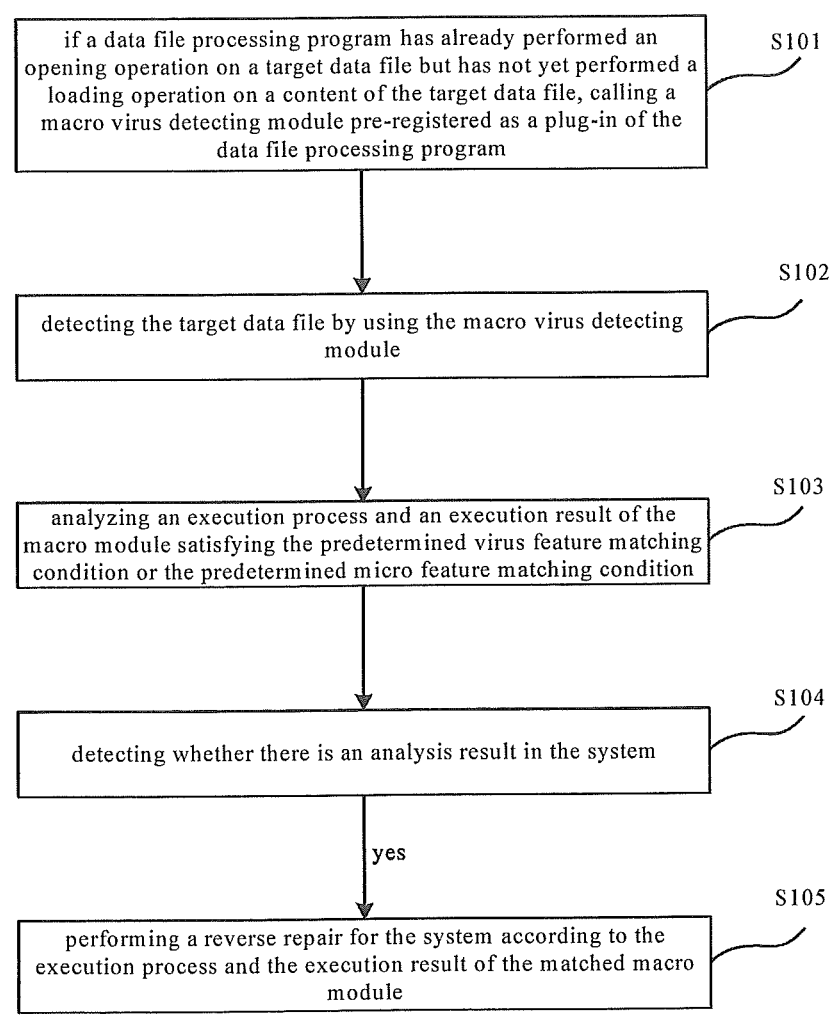
FIG. 2 is a flow chart illustrating another method for detecting macro viruses according to an embodiment of the present disclosure.

Based on the embodiment of the present disclosure shown in FIG. 1, the embodiment of the present disclosure shown in FIG. 2 further includes following steps. In step S103, an execution process and an execution result of the feature matched macro module (the macro module satisfying the predetermined virus feature matching condition or the predetermined micro feature matching condition) is analyzed. In step S104, it is detected whether there is an analysis result in a system. In step S105, if there is the analysis result in the system, a reverse repair for the system is performed according to the execution process and the execution result of the feature matched macro module.

For example, an execution process and an execution result of the feature matched macro module are analyzed to be: releasing the drive file xxx.sys under the drive directory; and then it is detected whether there is a file xxx.sys under a drive directory of the system, if yes, the file xxx.sys is deleted.

For an excel document including the macro table, the execution process and the execution result of the macro table may also be analyzed, and then it is detected whether an analysis result exists in the system; and if the analysis result exists in the system, the reverse repair for the system is performed according to the execution process of the macro table.

Applying the embodiment of the present disclosure shown in FIG. 2, the execution process of the feature matched macro module and the effect on the system caused by the execution result may be analyzed, and the system may be repaired according to the analysis result, thus avoiding a hidden danger of the effect on the system caused by running the feature matched macro module when the system is running.

Figure 3:
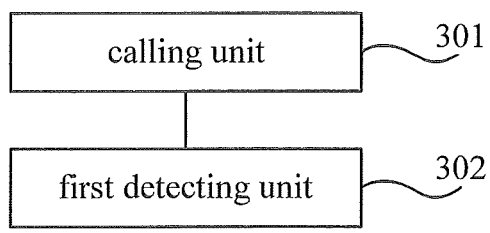
FIG. 3 is a block diagram illustrating an apparatus for detecting macro viruses according to an embodiment of the present disclosure.

FIG. 3 shows an apparatus for detecting macro viruses according to an embodiment of the present disclosure, and as shown in FIG. 3, the apparatus includes a calling unit 301 and a first detecting unit 302.

The calling unit 301 is configured to call a macro virus detecting module pre-registered as a plug-in of a data file processing program, if the data file processing program has already performed an opening operation on a target data file but has not yet performed a loading operation on a content of the target data file.

The first detecting unit 302 is configured to detect the target data file by using the macro virus detecting module.

The calling unit 301 is specifically configured to:
  detect whether the target data file includes a macro module, if the data file processing program has already performed the opening operation on the target data file but has not yet performed the loading operation on the content of the target data file; and call the macro virus detecting module pre-registered as the plug-in of the data file processing program if the target data file includes the macro module.

The first detecting unit 302 is specifically configured to:
  detect the macro module included in the target data file by using the macro virus detecting module.

The first detecting unit 302 in the embodiments includes an extracting sub-unit, a first matching sub-unit and a first outputting sub-unit (not shown).

The extracting sub-unit is configured to extract features of each macro module.

The first matching sub-unit is configured to match the features with a virus feature built-in the macro virus detecting module.

The first outputting sub-unit is configured to output a warning message of deterministic macro viruses if a predetermined virus feature matching condition is satisfied.

The first detecting unit 302 in the embodiment further includes a second matching sub-unit and a second outputting sub-unit (not shown).

The second matching sub-unit is configured to further match the features with a micro feature built-in the macro virus detecting module if no feature matches with the virus feature.

The second outputting sub-unit is configured to output a warning message of non-deterministic macro viruses if a predetermined micro feature matching condition is satisfied.

Further, in practical use, the predetermined micro feature matching condition may be: a number of features extracted from the macro module and matched with the micro feature in the macro virus detecting module is greater than a predetermined threshold.

Applying the embodiment of the present disclosure shown in FIG. 3, the macro virus detecting module is pre-registered as the plug-in of the data file processing program, and in the case that the data file processing program has already performed the opening operation on the target data file but has not yet performed the loading operation on the content of the target data file, the macro virus detecting module is called to perform the detection on the target data file. Therefore, the macro virus detecting module may identify the format of all data files and may perform an internal analysis of the data files, thus improving the coverage of the detected data files.

In addition, the macro virus detecting module is called once only when the data file processing program has already performed the opening operation on the target data file but has not yet performed the loading operation on the content of the target data file, and is no longer running after the detection is completed. Compared with the existing method in which the behaviors are monitored in real time, using the method according to embodiments of the present disclosure, the occupied system resources are reduced, and warnings are not given frequently when the user operates the data file, thus improving the user experience.

Figure 4:
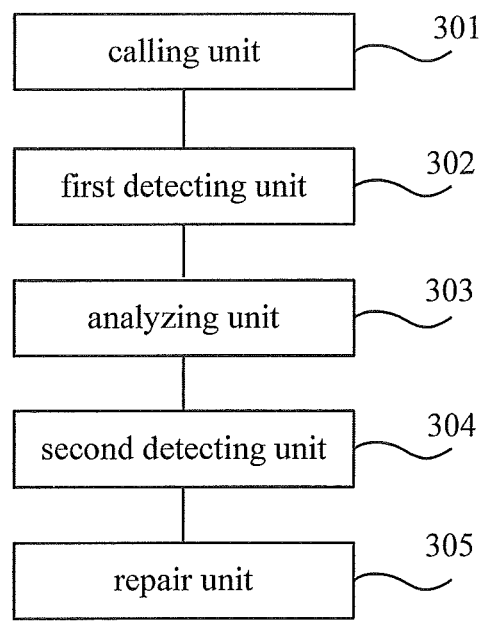
FIG. 4 is a block diagram illustrating another apparatus for detecting macro viruses according to an embodiment of the present disclosure.

FIG. 4 shows another apparatus for detecting macro viruses according to an embodiment of the present disclosure, and as shown in FIG. 4, the apparatus includes a calling unit 301, a first detecting unit 302, an analyzing unit 303, a second detecting unit 304 and a repair unit 305.

The analyzing unit 303 is configured to analyze an execution process and an execution result of the macro module satisfying the predetermined virus feature matching condition or the predetermined micro feature matching condition.

The second detecting unit 304 is configured to detect whether there is an analysis result in a system.

The repair unit 305 is configured to perform a reverse repair for the system according to the execution process and the execution result of the macro module if a detecting result of the second detecting unit is yes.

Applying the embodiment of the present disclosure shown in FIG. 4, the execution process of the feature matched macro module and the effect on the system caused by the execution result may be analyzed and the system may be repaired according to the analysis, thus avoiding a hidden danger of the effect on the system caused by running the feature matched macro module when the system is running.

Embodiments of the present disclosure also provide a computer-readable storage medium for storing computer programs that, when executed, performs the above method for detecting macro viruses.

It should be noted that, in the present disclosure, relational terms such as first and second are only used distinguish one entity or operation from another entity or operation, but do not require or imply any actual relation or order between these entities or operations. Moreover, terms such as "including", "comprising" or any other variants are intended to cover non-exclusive containing, such that the process, method, product or apparatus including a series of elements does not only include those items, but also include other elements which are not listed explicitly, or also include elements inherently included in the process, method, product or apparatus. Without more limitations, the element defined by a phase of "including a/an . . . " does not exclude that the process, method, product or apparatus including the element includes other equivalent elements.

Various embodiments in the specification are described by correlated ways, the same or similar parts between the various embodiments may be referenced with each other, and the described highlight of each embodiment is different from others. In particular, for the apparatus embodiment, since it is substantially similar to the method embodiment, it is relatively simple description, and relevant parts may reference to section explains in the method embodiment.

It should be understood for those skilled in the art that, all or part of steps implementing the above method embodiments can be realized by programs to instruct related hardware. The programs can be stored in a computer-readable storage medium, and the storage medium herein is ROM/RAM, disk, CD, etc.

The above description is only preferred embodiments of the present disclosure and is not used to limit the present disclosure. Any modification, alternative or improvement made within the spirit and principle of the present disclosure falls in the protection scope of the present disclosure.

What is claimed is:

1. A method for detecting macro viruses, comprising:
    detecting whether a target data file includes a macro module when a data file processing program has already performed an opening operation on the target data file but has not yet performed a loading operation on a content of the target data file; and
    in response to the target data file including the macro module:
        calling a macro virus detecting module that was pre-registered as a plug-in of the data file processing program;
        extracting features of the macro module;
        matching the features with virus features built-in the macro virus detecting module;
        outputting a warning message indicating a deterministic presence of a macro virus in response to a predetermined virus feature matching condition being satisfied;
        matching the features with micro features built-in the macro virus detecting module in response to the predetermined virus feature matching condition not being satisfied; and
        outputting a warning message indicating a non-deterministic presence of a macro virus in response to a number of features matched with the micro features being greater than a predetermined threshold.

2. The method according to claim 1, further comprising:
    analyzing an execution process and an execution result of the macro module satisfying the predetermined virus feature matching condition;
    detecting whether there is an analysis result in a system; and
    when there is an analysis result, performing a reverse repair for the system according to the execution process and the execution result of the macro module satisfying the virus feature matching condition.

3. An apparatus for detecting a macro virus, comprising:
    a non-transitory computer-readable storage medium comprising computer-executable instructions stored thereon; and
    one or more processors configured by the instructions to execute one or more software units, the one or more software units comprising:
        a calling unit configured to (i) detect whether a target data file includes a macro module when a data file processing program has already performed an opening operation on the target data file but has not yet performed a loading operation on a content of the target data file and (ii) in response to the target data file including the macro module, calling a macro virus detecting module that was pre-registered as a plug-in of the data file processing program;

an extracting sub-unit configured to extract features of each macro module;

a first matching unit configured to match the features with virus features built-in the macro virus detecting module;

a first outputting unit configured to output a warning message indicating a deterministic presence of a macro virus in response to a predetermined virus feature matching condition being satisfied;

a second matching unit configured to match the features with micro features built-in the macro virus detecting module in response to the predetermined virus feature matching condition not being satisfied; and a second outputting unit configured to output a warning message indicating a non-deterministic presence of a macro virus in response to a number of features matched with the micro features being greater than a predetermined threshold.

4. The apparatus according to claim 3, the one or more software units further comprising:

an analyzing unit configured to analyze an execution process and an execution result of the macro module satisfying the predetermined virus feature matching condition;

a second detecting unit configured to detect whether there is an analysis result in a system; and a repair unit configured to perform a reverse repair for the system according to the execution process and the execution result of the macro module when a detecting result of the second detecting unit is yes.

5. A non-transitory computer-readable storage medium, configured for storing computer programs that, when executed, performs a method for detecting macro viruses, the method comprising:

detecting whether a target data file includes a macro module when a data file processing program has already performed an opening operation on the target data file but has not yet performed a loading operation on a content of the target data file; and in response to the target data file including the macro module:

calling a macro virus detecting module that was pre-registered as a plug-in of the data file processing program;

extracting features of the macro module;

matching the features with virus features built-in the macro virus detecting module;

outputting a warning message indicating a deterministic presence of a macro virus in response to a predetermined virus feature matching condition being satisfied;

matching the features with micro features built-in the macro virus detecting module in response to the predetermined virus feature matching condition not being satisfied; and outputting a warning message indicating a non-deterministic presence of a macro virus in response to a number of features matched with the micro features being greater than a predetermined threshold.

6. The non-transitory computer-readable storage medium according to claim 5, the method performed by the computer programs stored on the non-transitory computer-readable storage medium further comprising:

analyzing an execution process and an execution result of the macro module satisfying the predetermined micro feature matching condition;

detecting whether there is an analysis result in a system; and when there is an analysis result, performing a reverse repair for the system according to the execution process and the execution result of the macro module satisfying the predetermined micro feature matching condition.

\* \* \* \* \*